Nov. 3, 1931.  A. P. DANNER  1,830,193

CHRISTMAS TREE STAND

Filed April 13, 1931

INVENTOR.
Albert P. Danner
BY
Chamberlain & Newman
ATTORNEYS.

Patented Nov. 3, 1931

1,830,193

UNITED STATES PATENT OFFICE

ALBERT P. DANNER, OF BRIDGEPORT, CONNECTICUT

CHRISTMAS TREE STAND

Application filed April 13, 1931. Serial No. 529,678.

My invention relates to Christmas tree stands and more particularly comprises an improvement upon that class of Christmas tree stand shown and described in my prior Patent #1,127,866 dated February 9, 1915, and has for its object certain improvements in details of construction of stands of this sort, whereby the same can be made entirely of strip metal arranged and assembled to form an operatable unit upon which a tree may be attachably supported in an upright position in the stand.

A further and important object of the invention is to provide means, whereby the butt end of the tree may be securely fastened to the base so as to prevent the base from pulling away from the end of the tree when the weight of the tree is put upon it, and whereby after the end of the tree has been secured to the base the upper portion can be adjusted and secured in a truly vertical position, and further to provide means whereby the said upper portion of the tree may be properly braced to retain it in position and in a way to hold the entire lower end portion of the tree in fixed relation to the several members of the stand.

A further and important object of the invention is to construct and assemble the several metal parts so as to permit the unit to be folded when not in use, as for shipment, in a more compact form than is possible with my old form of stand or with other tree holders of this character with which I am familiar.

With these and other objects in view, the invention resides and consists in the construction and novel combination and arrangement of parts hereinafter more fully described, illustrated in the accompanying drawings, and pointed out in the claim hereto appended, it being understood that various changes in the form, proportion, size, and minor details of construction within the scope of the claim may be resorted to without departure from the spirit, or sacrificing any of the advantages of the invention.

Similar characters of reference denote like or corresponding parts throughout the several figures of the accompanying drawings forming a part of this specification and upon which Fig. 1 shows a side elevation of my improved form of Christmas tree stand, the butt end of a tree being indicated therein, in dotted lines;

All the parts, except the screws and rivets, used in the formation of my improved Christmas tree stand are formed of cold rolled steel strips, that may be of the same gauge and width, and cut into suitable lengths and bent to desired shapes. In this connection it will also be noted that the three leg members are all of the same length and size as are also the three brace members.

Figure 3:
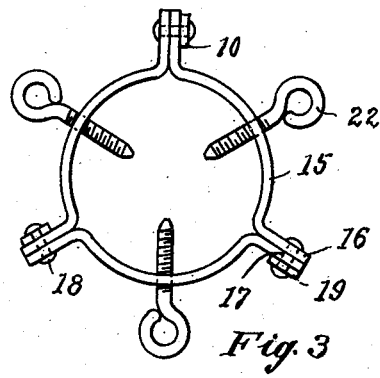
Fig. 3 is a top plan view of the upper circular girdle member.
Figure 4:
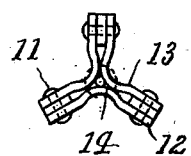
Fig. 4 is a similar plan view of the base member with attached legs.
Figure 5:
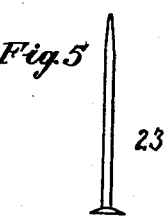
Fig. 5 shows a side elevation of a common form of wire nail used for securing the butt end of the tree to the base.

The base is made of three like pieces of strip metal, that are punched and bent in a like manner so as to permit the end portions to be secured together by rivets as shown in Fig. 4. The same is true of the girdle member shown in Fig. 3 wherein the three bent members, when assembled, form a relatively large circle or ring for surrounding the butt end portion of the tree, and have their outwardly deflected end portions secured by means of rivets.

Referring in detail to the characters of reference marked upon the drawings, 10 represents the leg members, there being preferably three in number, the end portions of the legs are rounded, forming feet for the stand while the other ends are punched to receive rivets 11 upon which they are hingedly supported as between the outwardly disposed ends 12 of the U-shaped base members 13. There are three of these base members arranged with their back or convexed portions disposed against each other in a way to form a central opening 14 therebetween. The rivets 11 serve to secure the members 13 together and in position one against the other but with their end portions 12 properly spaced to allow the hinged ends of the legs 10 to swing freely therebetween.

The girdle member 15 is formed of three sheet metal parts, the main bodies of which are bent into circular shape so that the three sections, when assembled, will form a complete circle or ring. The end portions 16 of these sections are disposed out radially and each positioned against the sides of the adjoining outwardly disposed end portions so that the holes 17 in said ends will align to receive the rivets 18 that hold the several sections together. One end portion of a brace 19 is hingedly secured to each of these rivets 18 while the other ends of the braces are similarly connected to rivets 20 secured in holes in the intermediate portion of the leg members 10.

Figure 1:
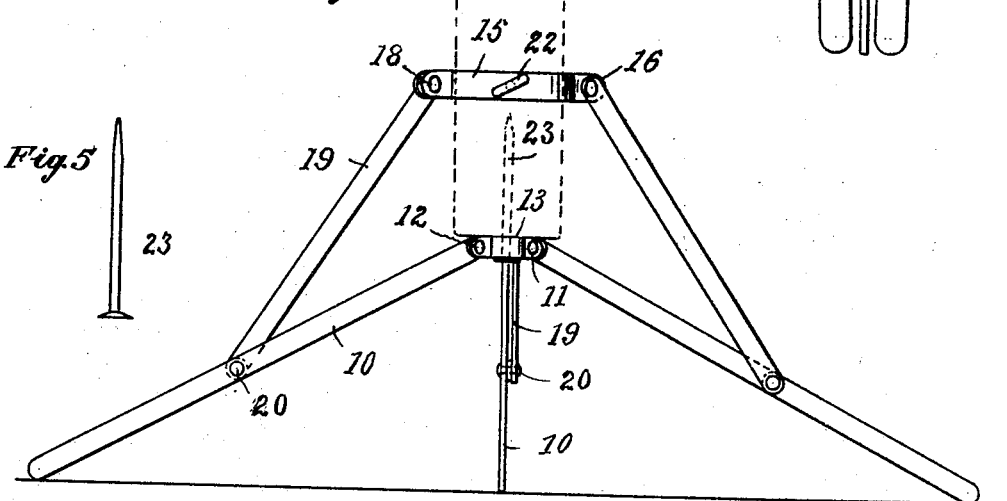

In practice the butt end of a tree 21, indicated in Fig. 1 by dotted lines, is positioned in the girdle member, the screws 22 having first been adjusted to their outermost position, and the end of the butt of the tree seated upon the top side of the base 13, whereupon a nail 23 screw or the like, is positioned in the opening 14 of the base and driven up into the trunk of the tree. With the nail so positioned, the stand is set up on its legs which causes the girdle member to creep up on the trunk of the tree since the nailed end of the tree is securely held against the base. This brings the entire weight upon the base, leaving the tree to be properly centered and further secured by means of the radial adjusting screws mounted in the girdle member. The braces obviously serve to retain the girdle member in proper alignment with the ends of the legs and the base so as to form a relatively rigid structure when a tree is mounted therein, as indicated in Fig. 1.

This feature of securing the tree to the base of a stand of this type is commercially important since it was found in many instances with the old type of stands that upon setting up the tree and stand the base would pull away from the end of the tree, thus leaving it without support and permitting it to topple over.

Figure 2:
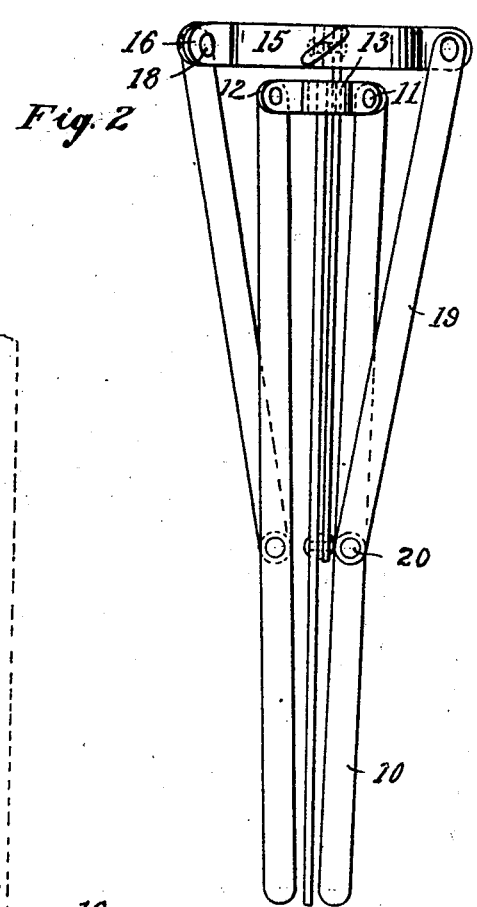
Fig. 2 shows in side elevation on an enlarged scale my Christmas tree stand in a folded position.

It will also be observed that a further advantage is obtained by the structure herein shown in that the stand may be folded into a smaller space than was possible with the old stand, as the base can be positioned up close against the girdle member and the lower ends of the legs brought closer together, as shown in Fig. 2. In this respect it will further be observed that the stand can be reversely folded to advantage; that is to say, the free end of the leg members can be disposed up in toward the girdle member and the base projected out to form the small end. Such a method of folding was not possible with my old stand since the base member thereof was formed of cast metal and included a shoulder portion which prevented a reverse positioning of the legs with respect to the base.

Having thus described my invention, what I claim and desired to secure by Letters Patent is:

A Christmas tree holder including a base formed of three assembled U-shaped metal pieces having holes in their end portions and having their convex portions abutted against that of two of the other pieces and forming a central hole therethrough, rivets secured in the aligned holes of the end portions of the U-shaped pieces, leg members hingedly mounted on said rivets intermediate the end portions of said U-shaped pieces, a circular girdle member also formed of three suitably bent metal strips having radially disposed end portions that are positioned one against the other and having aligned holes therein, rivets in the holes for securing the members together, braces one end of each of which is hingedly secured to each of said rivets and the other end to a similar rivet mounted in the intermediate portion of the before mentioned legs.

Signed at Bridgeport in the county of Fairfield and State of Connecticut this 11th day of April, A. D. 1931.

ALBERT P. DANNER.